(12) United States Patent
Howe et al.

(10) Patent No.: US 6,486,237 B1
(45) Date of Patent: Nov. 26, 2002

(54) SILICONE COMPOSITION CROSS-LINKABLE INTO ADHESIVE GEL AND ABSORBER WITH MICROSPHERES

(75) Inventors: Fabienne Howe, Caluire (FR); Christian Pusineri, Serezin du Rhone (FR)

(73) Assignee: Rhodia Chimie, Boulogne Billancourt Cedax (FR)

( * ) Notice: Subject to any disclaimer, the term of this patent is extended or adjusted under 35 U.S.C. 154(b) by 0 days.

(21) Appl. No.: 09/530,401

(22) PCT Filed: Oct. 28, 1998

(86) PCT No.: PCT/FR98/02307

§ 371 (c)(1),
(2), (4) Date: Jun. 21, 2000

(87) PCT Pub. No.: WO99/21918

PCT Pub. Date: May 6, 1999

(30) Foreign Application Priority Data

Oct. 29, 1997 (FR) .............................. 97 13809

(51) Int. Cl.⁷ .............................. C08L 85/07
(52) U.S. Cl. .................... 524/71; 523/113; 524/267; 524/68; 525/479; 528/15; 528/32; 528/34; 528/31
(58) Field of Search .............. 528/15, 31, 32, 528/34; 521/91, 134, 139, 154; 524/267, 69, 71; 523/113; 525/479

(56) References Cited

U.S. PATENT DOCUMENTS

| | | | | |
|---|---|---|---|---|
| 4,072,635 A | * | 2/1978 | Jeram | ......................... 523/113 |
| 5,162,397 A | * | 11/1992 | Descamps et al. | |
| 5,246,973 A | * | 9/1993 | Nakamura et al. | |
| 5,679,734 A | * | 10/1997 | Peccoux et al. | |
| 5,744,507 A | * | 4/1998 | Angell et al. | |
| 5,750,581 A | * | 5/1998 | Brennenstuhl et al. | |
| 6,054,651 A | * | 4/2000 | Fogel et al. | |

FOREIGN PATENT DOCUMENTS

| | | | | |
|---|---|---|---|---|
| EP | 0 553 843 | 8/1993 | ........... | C08L/83/04 |
| EP | 0 722 989 | 7/1996 | ........... | C08L/83/04 |
| EP | 0 737 721 | 10/1996 | ........... | C08L/83/07 |
| EP | 0 771 842 | 5/1997 | ........... | C08K/7/22 |

* cited by examiner

*Primary Examiner*—Robert Dawson
*Assistant Examiner*—Marc S Zimmer

(57) ABSTRACT

The invention concerns a silicone composition cross-linkable by hydrosilylation into adhesive gel and absorber, characterized in that it comprises:(I) at least a polyorganosiloxane POS (I); (II) at least a polyorganosiloxane POS (II); (III) at least an adhesive promoter (III); (IV) hollow organic microspheres ; (V) optionally at least a polyorganosiloxane POS (V) particularly useful as diluent of POS (I); (VI) an effective amount of hydrosilylation catalyst, preferably of the platinous type.

11 Claims, No Drawings

SILICONE COMPOSITION CROSS-LINKABLE INTO ADHESIVE GEL AND ABSORBER WITH MICROSPHERES

This application is an application under 35 U.S.C. Section 371 of International Application No. PCT/FR98/02307 filed on Oct. 28, 1998.

The field of the present invention is that of compositions based on polyorganosiloxanes (POS) which are capable of crosslinking by addition or hydrosilylation reactions involving hydrogen substituents and ethylenically unsaturated radicals, that is to say alkenyls, in particular of the vinyl type. The hydrosilylation is generally catalysed by metal compounds, for example of platinum nature.

The present invention relates more specifically to silicone compositions which can be crosslinked by hydrosilylation at room temperature or at a higher temperature into an adhesive and cushioning gel.

Another subject-matter of the present invention is the gels resulting from the crosslinking of the abovesaid compositions.

Finally, the invention targets the storable precursor systems of such silicone gels.

Within the meaning of the present invention, the term silicone gel denotes a crosslinked silicone product characterized in particular by a degree of penetration of between 50 and 500 tenths of a mm (measurement by ASTM D 217 penetrometry).

The use of silicone gels or elastomers in the fields of hygiene, comfort or cushioning is widespread. Their non-toxic nature, the fact that these products cannot act as substrates for microorganisms, the possibilities of varying their viscoelastic characteristics, their stability with respect to disinfectants, and the like, are the cause of these developments.

These gels have also been used for the protection of electronic equipment sensitive to vibrations, to impacts, to temperature and more generally to physical and chemical attacks from the surrounding atmosphere.

However, silicone elastomers fundamentally exhibited two disadvantages: their price and their relative density. The use of silicone foams was a way of circumventing these limitations and required the development of specific formulations. Another way was to introduce glass microspheres into existing formulations. The introduction of microspheres makes it possible to lower the relative density of the materials. Microspheres of this type have been widespread since the 1970s.

Thus, U.S. Pat. Nos. 4,380,569, 3,986,213 and FR-A-2,487,191 disclose the preparation of prostheses, in particular breast prostheses, from a gel-precursor silicone composition and from rigid hollow microspheres, for example glass microspheres.

However, the use of rigid microspheres very obviously results in the introduction of a rigid phase into an elastomeric phase and in a decline in the cushioning ability.

To overcome these drawbacks, provision has been made for the use of elastomeric microspheres. These more or less elastic microspheres are obtained by expansion of expandable microspheres comprising an organic liquid: see, for example, U.S. Pat. No. 3,615,972 and EP-A-486,080. Their walls are generally based on acrylonitrile polymers or on acrylonitrile/vinylidene chloride copolymers.

The incorporation of expanded or expandable elastomeric microspheres has increased since the 1980s in applications which range from mastics, seals and fittings, and shock, vibration and sound absorbers to prostheses, in particular breast prostheses: DE-A-3,l00,746, DE-A-3,210,094, U.S. Pat. No. 5,202,362, JP-A-58 186677, EP-A-722,989 and EP-A-733,672.

EP-A-186,493 discloses a precursor composition for a silicone elastomer of use as a sound- and vibration-absorbing material which incorporates elastic hollow microspheres. The composition can be of the two-component polyaddition type which can be crosslinked at room temperature, such as the product sold under the name Toray CY52, and can result in an elastomer having a penetration of approximately 50 to 200 according to the standard indicated.

FR-A-2,665,706 provides a compressible material, injectable as a thin layer, for a locking seal composed of a crosslinked polysiloxane elastomer in which are dispersed hollow microspheres formed from copolymer of vinylidene chloride and of acrylonitrile. The composition comprises at least one reactive polysiloxane oil which can be crosslinked under cold conditions and a crosslinking catalyst, for a polycondensation or polyaddition composition of RTV type, to which fillers may also be added.

U.S. Pat. No. 3,865,759, on the other hand, provides a silicone composition which crosslinks into a foam of low relative density but of high compressive strength. It is used in particular in the field of injected linings of ski boots, the processing consisting in injecting the composition into the boot and in then curing the composition in the boot directly around the foot. The use of a very specific catalyst, based on tin carboxylate, makes it possible to achieve a very high degree of crosslinking and, consequently, a high compressive strength. The presence of microspheres makes it possible to confer, on the crosslinked product, its foam aspect and therefore to decrease the relative density thereof. These microspheres can be made of glass, of carbon, of phenolic or epoxy resin, of silica, of vinylidene chloride/acrylonitrile resin or of urea-formaldehyde resin.

EP-A-681,814 relates to the manufacture of breast prostheses from a conventional polyaddition silicone composition to which may be added microspheres as bulking filler.

U.S. Pat. No. 4,451,584 relates to the use of filler-comprising silicone compositions for the moulding of parts of the human body, in particular in the fields of teeth prostheses and orthopaedic prostheses. Conventional inorganic fillers are replaced here by expandable organic microspheres in order to decrease the relative density of the composition and to improve certain characteristics specific to this application.

Finally, U.S. Pat. No. 5,246,973 discloses a precursor composition for a silicone elastomer-foam formed of 100 parts by weight of a precursor formula for a silicone elastomer which can be crosslinked by heating and of 0.1 to 30 parts by weight of hollow microspheres which can be expanded by heating. The precursor formula for a silicone elastomer is exemplified by conventional polyaddition formulae comprising a diorganopolysiloxane having at least 2 alkenyl groups per polymer chain, an organopolysiloxane having, per polymer chain, at least 2 hydrogen atoms bonded to the silicon and a catalyst based on a metal from the platinum group.

Conventionally, the incorporation of microspheres is known, on the one hand, to lighten the final material while retaining the cushioning properties and, on the other hand, to decrease the cost price of these materials.

These improvements are still not sufficient to establish silicone gels in the general field of cushioning where other materials are predominantly used, for example polyurethane gels in the field of cushioning, for example for soles for sports shoes.

The present invention has been given the objective of further improving the mechanical properties of silicone gels/elastomers and very particularly the general cohesion of the final material.

Another objective of the invention is to provide such gels which are capable of competing with polyurethane gels in the field of cushioning, in particular of Coles for sports shoes, and which even exhibit superior mechanical properties, in particular a better crushing fatigue strength.

The Applicant Company has noticed that it is possible to improve the mechanical properties of the gels obtained by synergistically combining elastic hollow microspheres and a promoter which develops the adhesion between the microspheres and the continuous phase in the silicone elastomer. Thus, remarkably, high cohesion between the silicone phase and the dispersed phase is obtained while retaining strong adhesion of the gel to its substrate.

The term "adhesive gel" is understood to mean a gel which develops an internal adhesive nature with respect to microspheres and an external adhesive nature with respect to a possible substrate.

In particular, it has proved to be extremely profitable to use the silicone compositions disclosed in U.S. Pat. No. 5,371,163 and EP-A-0,737,721 comprising an extending polyorganosiloxane as adhesion promoter.

The main subject-matter of the present invention is therefore a silicone composition which can be crosslinked by hydrosilylation into an adhesive and cushioning gel, characterized in that it comprises:

(I)—at least one polyorganosiloxane POS (I) comprising:
  end siloxyl units of type $M=(R)_2(Hrf)SiO_{1/2}$ with:
    R identical to or different from one another and corresponding to a linear or branched $C_1$–$C_6$ alkyl group and/or an aryl group which may or may not be substituted,
    Hrf corresponding to a type of Hydrosilylation reactive functional group, hydro or alkenyl, vinyl being one of the preferred alkenyls, and
  identical or different siloxyl units of type $D=(R^1)_p(Hrf)_qSiO_{2/2}$, in which Hrf is as defined above, $R^1$ corresponds to the same definition as R and p=1 or 2, q=0 or 1 and p+q=2, (II)—at least one polyorganosiloxane POS (II) comprising:
  end siloxyl units $M=(Hrf)_s(R^2)_tSiO_{1/2}$ with:
  Hrf as defined above,
    $R^2$ corresponding to the same definition as R,
    s=0, 1, 2 or 3 and t=0, 1, 2 or 3 and s+t=3
  identical or different siloxyl units $D=(Hrf)_u(R^3)_vSiO_{2/2}$ with:
    Hrf as defined above,
    $R^3$ corresponding to the same definition as R,
    u=0, 1 or 2, v=0, 1 or 2 and u+v=2; with the condition according to which at least one of the D units of the POS (II) carries an Hrf (u=1, v=1)

(III)—at least one adhesion promoter (III), (IV)—organic hollow microspheres, (V)—optionally at least one polyorganosiloxane POS (V) which is of use in particular as diluent of the POS (I) and which comprises end siloxyl units $M=(R^6)_3SiO_{1/2}$ and siloxyl units $D=(R^7)_2SiO_{2/2}$ with $R^6$ and $R^7$ identical to or different from one another and corresponding to the same definition as R, (VI)—and an effective amount of hydrosilylation catalyst, preferably of platinum nature.

The combination of microspheres and of an adhesion promoter within the meaning of the present invention makes it possible to ensure, in combination with the other compounds present, the desired properties, the adhesive nature of the gel making it possible to guarantee high cohesion between the various phases after crosslinking, namely microspheres/gel and gel/substrate.

These materials are capable of developing viscoelastic properties. This state is suitable for providing appropriate cushioning qualities which make possible improved absorption of shocks and vibrations.

The gels obtained have, in addition, the advantage of being stable whatever the external conditions, in particular the temperature conditions. In particular, they are highly resistant to low temperatures, the latter not affecting their gel texture.

The microspheres (IV) are preferably expandable organic microspheres comprising, as is known per se, a polymer wall comprising a liquid or a gas. These microspheres are expanded by heating them beyond the softening point of the polymer and to a temperature sufficient to vaporize the liquid or suitably expand the gas, which can be, for example, an alkane, such as isobutane or isopentane. The wall can be composed, as is known per se, of polymers or copolymers, for example prepared from vinyl chloride, vinylidene chloride, acrylonitrile, methyl methacrylate or styrene monomers, or mixtures of polymers and/or copolymers, for example, in particular, acrylonitrile/methacrylonitrile copolymer or acrylonitrile/vinylidene chloride copolymer. See in particular U.S. Pat. No. 3,615,972.

They can be incorporated in the composition without distinction in the expanded state or before their expansion, which can be induced, by appropriate heating, during the crosslinking of the gel.

It can be advantageous for the microspheres to be surface treated, as is known per se, in order to promote the dispersion thereof in the composition; they can in particular be expandable or expanded microspheres exhibiting an inorganic coating, for example silica or salts or hydroxides of metals such as Ca, Mg, Ba, Fe, Zn, Ni or Mn, as is disclosed, for example, in EP-A-486,080, or carbonates, for example calcium carbonate.

Use is made, as preferred example, of the microspheres sold under the name Dualite® by UCB Chemicals.

Before their expansion, the microspheres will preferably have a diameter of between 3 and 50 µm, more particularly between 5 and 30 µm.

After expansion (in situ or original), a diameter will also be sought of in particular between 10 and 150 µm, especially between 20 and 100 µm.

These microspheres are present in particular in a proportion of 1 to 30% by weight, preferably of 2 to 10% by weight and more preferably of 2 to 4% by weight with respect to the total composition.

The hydrosilylation reactive functional groups (Hrf) of the POS (I) are preferably of a single type, either hydrogen or alkenyl, it being known that, among the alkenyls, vinyls are those which are most commonly used. The Hrfs are preferably alkenyls, preferentially vinyls. These functional groups react very well with the hydrogen according to an addition mechanism.

More preferably still, the POS (I) does not have an Hrf within its chain but only at its ends (q=0 in the D units).

In accordance with the preferred embodiment of the invention, the POSs (I) have Hrfs=Vi in the M units and q=0 in the D units.

However, in an alternative form, the end Hrfs (M units) of the POSs (I) correspond to hydrogen and q=0 in the D units.

In practice, the most readily employed POSs (I) are α,ω-(dimethylvinylsiloxy)polydimethylsiloxanes for the preferred embodiment and α,ω-(dimethylhydrosiloxy) polydimethylsiloxanes for the alternative form.

Such POSs (I) are commercially available.

As regards the POS (II), it can be classified as the crosslinking agent of the composition and preferably comprises a single type of Hrf distributed, advantageously, in the chains and optionally at the ends of the latter (in this case, u=1 or 2 in the units carrying Hrf and s≧1, preferably s=1, in the M units).

In the context of the preferred embodiment, the Hrfs of the POS (II) are hydrogen and they are advantageously found both in the chains and at their ends.

In the alternative form, the pendant and end Hrfs are represented by vinyls (Vi).

There are preferably two different types of D units in the POSs (II) but it is not excluded to have as many of them as are allowed by the u and v combinations of the formula given above for the D units of the POS (II).

Mention may be made, as examples of POS (II), of:

-α, ω-(dimethylhydrosiloxy) poly(dimethylsiloxy) (siloxymethylhydro)
        M                    D1                  D2 for the preferred embodiment:
and

-α, ω-(dimethylvinylsiloxy) poly(dimethylsiloxy) (methylvinylsiloxy)
        M                    D1                  D2 or the alternative form.

These POSs (II) are commercial products and are widely disclosed in the technical literature, both as regards their structures and their syntheses.

It should be noted that, advantageously, the Hrfs of the invention are:

either Hrf=Vi and its complement $Hrf_c$=H or Hrf=H and its complement $Hrf_c$=Vi.

It is entirely conceivable for the Hrfs and the $Hrf_c$s to be heterogeneously and randomly distributed in the POSs (I) and the POSs (II).

However, preferably, the Hrfs of each of the POSs (I) and (II) are identical to one another within the same type of POS and the Hrfs of the POS (I) are different from (complementary to) those of the POS (II).

As regards the adhesion promoter (III), the preferred embodiment of the invention provides for the use of at least one compound of type (III-1), which is a polyorganosiloxane, hereinafter known as POS (III) and described as "extending", and which exhibits:

end siloxyl units M=$(Hrf)_w(R^4)_x SiO_{1/2}$ with:
  Hrf as defined above,
  $R^4$ corresponding to the same definition as R,
  w=1, 2 or 3, x=0, 1 or 2 and w+x=3; the Hrfs of this POS (III) being chosen so:
    that they react at least with the Hrfs of the end M units of the POS (I)
    that the ratio:

$r_1$=number of Hrf groups in the POS (II) number of Hrf groups in the POS (II) and in the POS (III)×100 is less than or equal to 95%, in particular less than 80%, preferably between 0.5 and 50% and more preferably still between 1 and 20% and that the molar ratio:

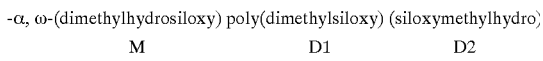

is less than or equal to 0.9, in particular 0.8, preferably of between 0.1 and 0.8, preferentially between 0.3 and 0.7;

siloxyl units D=$(R^5)_2 SiO_{2/2}$ with:
  $R^5$ corresponding to the same definition as R.

The Hrfs of the ends of the extending POS (III) are preferably chosen so that they preferably react with the Hrfs of the POS (I). To this end, it is therefore desirable, without this being limiting, for these Hrfs of the POS (III) to be only of a single type and complementary to those of the POS (I). Consequently, these Hrfs are generally and advantageously of the same nature as those of the crosslinking POS (II).

In the preferred embodiment, the Hrfs of the POS (III) are represented by hydrogen, whereas they correspond to vinyl in the alternative form.

In the preferred embodiment, the POS (III) advantageously has Hrfs only on these end M siloxyl units. It preferably has a much lower viscosity than the POS (I), for example of the order of that of the POS (II).

In accordance with the preferred embodiment, the ratios are more specifically:

$$r_1 = \frac{SiH\ of\ the\ POS\ (III)}{SiH\ of\ the\ POS\ (II) + (III)} \times 100$$

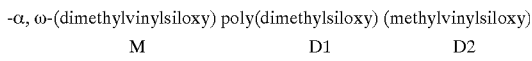

The Hrfs of the crosslinking agent (II) and of the extending agent (III), on the one hand, and, on the other hand, the complementary Hrfs of the structuring POS (I) are those which are capable of reacting together to form a crosslinking network and a gel in accordance with the invention.

Mention may be made, as practical example of POS (III), of:

α,ω-(dimethylhydrosiloxy)poly(dimethylsiloxy) for the preferred embodiment,

α,ω-(dimethylvinylsiloxy)poly(dimethylsiloxy) for the form alternative to this preferred embodiment.

The structure and the method of preparation of the POS (III) capable of being employed in the composition of the invention are, in addition, widely illustrated in the prior technical literature.

When, in accordance with the preferred embodiment of the invention, a compound of type (III-1), namely a POS (III), is chosen as compound (III), it is preferable for the proportions of Hrf and $Hrf_c$ which are present in each of the POSs (I) to (III) of the composition to be:

POS (I): Hrf=Vi and/or H, present in a proportion of 0.01 to 10% by weight, preferably of 0.05 to 1% by weight;

POS (II): Hrf=H and/or Vi, present in a proportion of 0.01 to 10% by weight, preferably of 0.1 to 1.5% by weight;

POS (III): Hrf=H and/or Vi, present in a proportion of 0.01 to 10% by weight, preferably of 0.05 to 1% by weight.

In an alternative form, the adhesion promoter (III) can be of (III-2) type and comprise:
at least one of the following compounds (III-2-1) and (III-2-2):
(III-2-1) at least one optionally alkoxylated organosilane comprising, per molecule, at least one $C_2$–$C_6$ alkenyl group,
(III-2-2) at least one organosilicon compound comprising at least one epoxy radical,
with optionally, in addition:
(III-2-3) at least one metal M chelate and/or one metal alkoxide of general formula: $M(OJ)_n$, with n=valency of M and J=linear or branched $C_1$–$C_8$ alkyl,
M being chosen from the group formed by: Ti, Zr, Ge, Li, Mn, Fe, Al and Mg.

Preferably, the optionally alkoxylated organosilane (III-2-1) is selected more particularly from the products of following general formula:

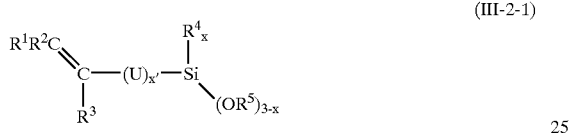

(III-2-1)

in which:
R$^1$, R$^2$ and R$^3$ are hydrogen or hydrocarbonaceous radicals which are identical to or different from one another and preferably represent hydrogen, a linear or branched $C_1$–$C_4$ alkyl or a phenyl which is optionally substituted by at least one $C_1$–$C_3$ alkyl,
R$^4$ and R$^5$ are identical or different radicals and represent a linear or branched $C_1$–$C_4$ alkyl,
x'0 or 1,
x=0 to 2, preferably 0 or 1 and more preferably still 0.

Without this being limiting, vinyltrimethoxy-silane or γ-(meth)acryloyloxypropyltrimethoxysilane can be regarded as a particularly appropriate compound (III-2-1).

As regards the organosilicon compound (III-2-2), provision is preferably made to choose it:
either from the products (III-2-2a) corresponding to the following general formula:

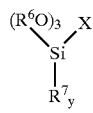

in which:
R$^6$ is a linear or branched $C_1$–$C_4$ alkyl radical,
R$^7$ is a linear or branched alkyl radical,
y is equal to 0, 1, 2 or 3, preferably to 0 or 1 and more preferably still to 0,
X is:

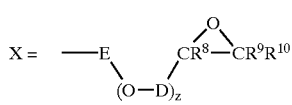

with
E and D being identical or different radicals chosen from linear or branched $C_1$–$C_4$ alkylenes,
z being equal to 0 or 1, R$^8$, R$^9$, R$^{10}$ being identical or different radicals representing hydrogen or a linear or branched $C_1$–$C_4$ alkyl, hydrogen being more particularly preferred,
it being possible for R$^8$ and R$^9$ or R$^{10}$ alternatively to constitute, together and with the two carbons carrying the epoxy, an alkyl ring having from 5 to 7 ring members,
or from the products (III-2-2b) composed of epoxyfunctional polydiorganosiloxanes comprising:
(i) at least one siloxyl unit of formula: (III-2-2b$_1$)

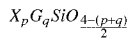

in which:
X is the radical as defined above for the formula (III-2-2a)
G is a monovalent hydrocarbonaceous group which does not have any unfavourable effect on the activity of the catalyst and which is preferably chosen from alkyl groups having from 1 to 8 carbon atoms inclusive which are optionally substituted by at least one halogen atom, advantageously from the methyl, ethyl, propyl and 3,3,3-trifluoropropyl groups, and from aryl groups and advantageously from the xylyl and tolyl and phenyl radicals,
p=1 or 2,
q=0, 1 or 2,
p+q=1, 2 or 3,
and (2i) optionally at least one siloxyl unit of formula: (III-2-2b$_2$)

in which G has the same meaning as above and r has a value of between 0 and 3, for example between 1 and 3.

The compounds (III-2-2) are preferably epoxyalkoxymonosilanes (III-2-2a).

Mention may be made, as examples of such compounds (III-2-2a), of:
3-glycidoxypropyltrimethoxysilane (Glymo)
or 3,4-epoxycyclohexylethyltrimethoxysilane.

As regards the compound (III-2-3), it can consist of or comprise a metal chelate. The metal M chosen can thus comprise one or more ligands, such as those derived in particular from a β-diketone, such as, for example, acetylacetone. The compound (III-2-3) can consist alternatively in or comprise a metal alkoxide having the formula $M(OJ)_n$ defined above where the alkoxy radicals are, for example, the n-propoxy and n-butoxy radicals. It should be noted that, in this formula, one or more alkoxy radicals OJ can be replaced by one or more constituent ligands of a chelate, such as, for example, an acetylacetonate ligand.

The preferred compounds (III-2-3) are those in which the metal M is chosen from the following list: Ti, Zr, Ge, Mn and Al.

It will be specified that titanium is more particularly preferred.

Concrete examples of compounds (III-2-3) which are highly suitable are those in the structure of which the metal M is chosen from the list: Ti, Zr, Ge, Mn and Al, and is used in combination:
as regards a chelate: with ligands of acetylacetonate type
as regards an alkoxide: with n-propoxy or n-butoxy radicals.

In accordance with the invention, the adhesion promoter of type (III-2) can be formed of:
(III-2-1) alone
(III-2-2) alone
(III-2-1)+(III-2-2),
according to two preferred forms:
(III-2-1)+(III-2-3)
(III-2-2)+(III-2-3)
and, finally, according to the most preferred form:
(III-2-1)+(III-2-2)+(III-2-3).

According to the invention, an advantageous combination in forming the adhesion promoter (III-2) is as follows: vinyltrimethoxysilane (VTMS)/3-glycidoxypropyltrimethoxysilane (Glymo)/butyl titanate.

When (III-2-1)+(III-2-2) is used, the proportions of (III-2-1) to (III-2-2), expressed as percentage by weight with respect to the total of the two, are:
(III-2-1): in particular from 5 to 95%, preferably from 30 to 70%
(III-2-2): in particular from 95 to 5%, preferably from 70 to 30%.

When (III-2-1)+(III-2-3) or (III-2-2)+(III-2-3) is used, the proportions by weight of (III-2-3) with respect to the (III-2-1) or (III-2-2)+(III-2-3) total are in particular from 5 to 25%, preferably from 8 to 18%.

Quantitatively, when (III-2-1)+(III-2-2)+(III-2-3) is used, it may be specified that the proportions by weight between (III-2-1), (III-2-2) and (III-2-3), expressed as percentages by weight with respect to the total of the three, are as follows:
  (III-2-1) >10, preferably of between 15 and 70 and more preferably still between 25 and 65,
  (III-2-2) <90, preferably of between 70 and 15 and more preferably still between 65 and 25,
  (III-2-3) >1, preferably of between 5 and 25 and more preferably still between 8 and 18,
it being understood that the sum of these proportions of (III-2-1), (III-2-2) and (III-2-3) is equal to 100%.

The adhesion promoter (III-2) is advantageously present in a proportion of 0.1 to 10, preferably of 0.5 to 5 and more preferably still of 1 to 4% by weight with respect to all the constituents of the composition, not including the microspheres.

According to an optional but nevertheless advantageous arrangement of the invention, the POS (I) is diluted using a POS (V) comprising M and D units, in which units the $R^6$ and $R^7$ substituents are preferably of the same nature as the R and $R^1$ substituents of the POS (I). More preferably still, $R^6=R^7=R=R^1=CH_3$.

This POS (V) is composed, for example, of an α,ω-(trimethylsiloxy)polydimethylsiloxane oil.

This type of POS is fully available commercially. The choice of the POS (V) diluent is naturally made according to the nature of the POS (I) and the POS (V) will preferably have a lower viscosity than that of the POS (I). Thus, in accordance with a preferred characteristic of the invention, the composition comprises at least one POS (V) with an essentially linear structure and with a lower dynamic viscosity than that of the POS (I), preferably at least 20 times lower and more preferably still 5 times lower than that of the POS (I).

The POS (V) diluent preferably has M and D units respectively comprising $R^6=R^7=CH_3$ to a level of approximately at most 20 mol % of M units and at least 80 mol % of D units.

More preferably, the POS (V) diluent is present in an amount of between 10 and 90% by weight, in particular between 40 and 80%, with respect to the POS (I)+POS (V) mixture.

The catalyst (VI) is preferably an organometallic platinum complex or alternatively one of the platinum-based catalysts conventionally employed in the catalysis of hydrosilylation reactions between SiH residues and SiVi residues. Mention may be made, by way of examples, of platinum black, chloroplatinic acid, a chloroplatinic acid modified by an alcohol, a complex of chloroplatinic acid with an olefin, an aldehyde, a vinylsiloxane or an acetylenic alcohol, inter alia. Patent U.S. Pat. No. 2,823,218 discloses a hydrosilylation catalyst of the chloroplatinic acid type and Patent U.S. Pat. No. 3,419,593 relates to catalysts formed by complexes of chloroplatinic acid and of organosilicone of the vinylsiloxane type. Complexes of platinum and of hydrocarbons which are of use as hydrosilylation catalyst are disclosed by U.S. Pat. Nos. 3,159,601 and 3,159,662. U.S. Pat. No. 3,723,497 discloses a platinum acetylacetonate and the subject-matter of U.S. Pat. No. 3,220,972 is catalysts based on platinum alkoxide.

As regards the catalytically effective amounts to be employed, it is obvious that a person skilled in the art in the field under consideration is fully able to determine the optimum amount of catalyst to promote the crosslinking. This amount depends in particular on the nature of the catalyst and on the POSs involved. To give an idea, it may be indicated that it will be in particular between 0.1 and 40 ppm (e.g. 30 ppm) per 100 parts by weight of POS (I).

According to other advantageous characteristics, the POS (I), POS (II), POS (V) and POS (III), when it is chosen, advantageously have a substantially linear structure.

The viscosity of the POSs of the composition according to the invention also constitutes a parameter to be taken into consideration, in particular with regard to the ease of handling of this composition and the viscoelastic properties of the gel capable of being obtained by crosslinking this composition.

In this respect and in accordance with an advantageous arrangement of the invention, the POS (I) is substantially linear and has a dynamic viscosity of less than or equal to 500,000 mPa·s, preferably of between 1000 and 200,000 mPa·s;

and/or the POS (II) is substantially linear and has a dynamic viscosity of less than or equal to 100,000 mPa·s, preferably 1000 mPa·s and more preferably still of between 10 and 400 mPa·s;

and/or, when it is present, the POS (III) is substantially linear and has a dynamic viscosity of less than or equal to 100,000 mPa·s, preferably 1000 mPa·s and more preferably still of between 10 and 100 mPa·s.

In practice, a composition according to the preferred embodiment of the invention can be that characterized in that:

the POS (I) comprises M units, at a level of 0.1 to 1 molar %, in which units R=CH$_3$ and Hrf=vinyl, and D units, at a level of 99 to 99.9 molar %, in which units $R^1=CH_3$, p=2 and q=0;

the POS (II) comprises siloxyl units of formula $R_2SiO_{2/2}$, wherein R is a linear $C_1$–$C_6$ alkyl group, or an aryl group, optionally substituted, M units, at a level of 1 to 6 molar %, in which units Hrf=H, $R^2=CH_3$, s=1 and t=2, and D units, at a level of 10 to 50 molar %, in which units $R^3=CH^3$, Hrf=H, u=1 and v=1;

the POS (III) comprises M units, at a level of 8 to 20 molar %, in which units Hrf=H, $R^4=CH_3$, w=1 and x=2, and D units, at a level of 80 to 92 molar %, in which units $R^5=CH_3$;

and in that the following are provided:
microspheres as described above;
a POS (V) diluent, the M and D units of which respectively comprise $R^6=R^7=CH_3$ and are present at a level of approximately at most 10 mol % of M units and at least 90% of D units, the diluent (V) preferably being present in an amount of between 10 and 906 by weight, preferably between 40 and 80% by weight, with respect to the POS (I)+(V) mixture.

The silicone composition according to the invention can additionally comprise at least one retardant of the addition reaction or one crosslinking inhibitor chosen from the following compounds:
polyorganosiloxanes substituted by at least one alkenyl which can optionally be provided in the cyclic form, tetramethylvinyltetrasiloxane being particularly preferred,
pyridine,
organic phosphites and phosphines,
unsaturated amides,
alkyl maleates
and acetylenic alcohols.

These acetylenic alcohols (see FR-A-1,528,464 and FR-A-2,372,874), which are among the preferred thermoblockers of the hydrosilylation reaction, have the formula:

$$R'-(R'')C(OH)-C\equiv CH$$

in which formula
R' is a linear or branched alkyl radical or a phenyl radical;
R" is H or a linear or branched alkyl radical or a phenyl radical; it being possible for the R' and R" radicals and the carbon atom situated α to the triple bond optionally to form a ring;
the total number of carbon atoms present in R' and R" being at least 5, preferably from 9 to 20.

The said alcohols are preferably chosen from those exhibiting a boiling point of greater than 250° C. Mention may be made, by way of examples, of:
1-ethynyl-1-cyclohexanol;
3-methyldodec-1-yn-3-ol;
3,7,11-trimethyldodec-1-yn-3-ol;
1,1-diphenylprop-2-yn-1-ol;
3-ethyl-6-ethylnon-1-yn-3-ol;
2-methylbut-3-yn-2-ol;
3-methylpentadec-1-yn-3-ol.

These α-acetylenic alcohols are commercial products.

Such a retardant is present in a proportion of 3000 ppm at most, preferably in a proportion of 100 to 1000 ppm, with respect to the total weight of the POS (I) and POS (II).

The presence of such compounds can be of use when expandable microspheres are used. This is because it can be judicious to adjust the hot crosslinking of the elastomer in order to allow time for the microspheres to expand.

In a way known per se, the silicone elastomer composition can also have added to it various conventional additives, such as, for example, fillers or dyes.

In order to improve the stability on storage of the compositions according to the invention and in order to provide the users with a commercial form which can be easily handled, provision is made for a system with at least two components A and B comprising the compounds (I) to (III) and optionally (V) and the catalyst (VI) of the compositions as defined hereinabove, each of these two components A and B being devoid of a mixture of (I)+(II) and/or (III) with catalyst (VI). The said catalyst (VI) is preferably solely present in one of the components A or B of the system.

The microspheres (IV) can be present in one or both parts A and B. It is also possible to add them after mixing the parts A and B together.

To simplify the use, it is preferable to provide a two-component system, the A:B proportions of which are between 100:2 to 10 and 2 to 10:100 parts by weight approximately.

As regards the preparation of the gel, it may be specified that the crosslinking of the composition into a gel takes place at room temperature or after heating to temperatures of between 80 and 180° C., for example. In this context, the necessary crosslinking times are, for example, between a few min and 1 hour 30 min.

These conditions are generally compatible with the use of expandable microspheres in situ. However, according to the characteristics of the microspheres and of the silicone composition, it will be possible to choose a heating time and temperature which are compatible with a suitable expansion of the microspheres before the curing of the silicone. Preferably, the operating conditions can be: heating between 80 and 180° C., in particular between 100 and 160° C., for from 1 to 5 minutes, in particular from 1 to 3 minutes.

The crosslinked adhesive gel obtained from the composition described hereinabove and the shaped products thus produced form subject-matters in their own right of the present invention.

Another subject-matter of the invention is the use of the system or of the gel in the preparation of prostheses, e.g. external breast prostheses, of stuffing for mattresses, cushions, seats and the like, or of shoe soles or inserts.

The present invention will now be described in more detail with the help of nonlimiting embodiments.

EXAMPLE

1) List of the Starting Materials Used
a) Part A
POS (I): polydimethylsiloxane oil blocked at each of the ends of the chains by a unit $(CH_3)_2ViSiO_{0.5}$, with a viscosity of 60,000 mPa·s and comprising approximately 0.003 vinyl functional group in 100 g of oil, i.e. approximately 0.08% by weight of vinyl functional group.

POS (V) (diluent of the POS (I)): α,ω-(trimethylsiloxy) polydimethylsiloxane oil, with a viscosity of 100 mPa·s.

Ingredient (VI): platinum in the zero oxidation state complexed with divinyltetramethyldisiloxane: use is made of a solution in divinyltetramethyldisiloxane of a platinum complex comprising approximately 11% by weight of platinum in the zero oxidation state with divinyltetramethyldisiloxane as ligand: the amounts of this catalyst are expressed as ppm of Pt metal contributed by the solution.

b) Part B
POS (I): see part A
POS (V): see part A
POS (III) (extender): polydimethylsiloxane oil blocked at each of the ends of the chains by a unit $(CH_3)_2HSiO_{0.5}$, having a viscosity of 20 mPa·s and comprising approximately 0.2 SiH functional group in 100 g of oil, i.e. approximately 0.2% by weight of H.

POS (II) (crosslinking agent): poly(dimethyl)(hydromethyl)siloxane oil blocked at each of the ends of the chains by a unit $(CH_3)_2HSiO_{0.5}$, having a viscosity of 300 mPa·s and comprising approximately 0.17 SiH functional group in 100 g of oil, i.e. approximately 0.17% by weight of H.

c) Microspheres (IV): distributed by the Company UCB Chemicals under the name of "Dualite" Organic Microspheres. These microspheres typically have the following characteristics:

relative density: 0.13 kg/l
  dimensions: from 25 to 70 μm
  nature: polyacrylonitrile, poly(vinylidene chloride)
  walls: 0.2 μm These microspheres are, in addition, covered with a layer of calcium carbonate which prevents any possibility of reagglomeration.

2) Make-up of the Composition in the Two-component Form Tested

|  | PART A | PART B |
|---|---|---|
| POS (I) | 50* | 49.1 |
| POS (V) | 50 | 50.0 |
| POS (II) | — | 0.855 |
| POS (III) | — | 0.045 |
| Cata (VI) | 30 ppm Pt | — |

(* parts by weight)

The crosslinking of the composition is carried out after mixing the 2 parts A and B in a 50/50 ratio by weight.

$$r_1 = \frac{SiH \text{ functional group nb of the POS (III)}}{SiH \text{ functional group nb of the POS (II) + (III)}} \times 100$$

$$= \frac{0.000045}{0.000775} \times 100 = 5.8\%$$

$$r_2 = \frac{SiH \text{ functional group nb of the POS (II) + (III)}}{Vi \text{ functional group nb of the POS (I)}}$$

$$= \frac{0.000775}{0.00149} = 0.52$$

3) Preparation of Compositions a) Composition 1

500 g of part A (relative density: 1.1) are placed in a hemispherical container made of stainless steel; 59 g of microspheres are introduced over 5 min using a non-scraping hemispherical stirrer rotating at a speed of 30 rev/min. Stirring is maintained for 10 min at 25° C.
the operation is repeated with the part B
250 g of each of the two filler-comprising parts A and B, that is to say comprising 50% by volume of microspheres, are subsequently mixed. The crosslinking is: 24 h at 25° C.

b) Composition 2

The preparation is carried out as above but diluting the parts A and B with 1 part of POS (V) per 1 part of part A and part B respectively (parts by weight).

4) Results

Comparative tests were carried out with the compositions 1 and 2 and, as control, equivalent compositions but without microspheres.

The viscosities of the various parts A and B with and without microspheres were measured, as well as the elastic moduli (G') and viscous moduli (G") of the A+B mixtures with and without microspheres.

The moduli were determined using a dynamic rheometer (Carrimed CSL-100) under the following conditions:
form of measurement: oscillation and controlled stress
controlled stress: 500 N/m²
frequencies: 0.1 to 10 Hz
geometry of the measurement: cone/plate; diameter=2 cm, angle=1°

The viscosity is measured using a Brookfield viscometer according to the directions of AFNOR Standard NFT 76 106 of May 1982.

| | | Test 1 | Test 2 | Test 3 | Test 4 |
|---|---|---|---|---|---|
| | Part A | 50.00 | 44.72 | 25.00 | 22.36 |
| | Microspheres | — | 2.95 | — | 2.95 |
| | POS (V) diluent | — | — | 25.00 | 22.36 |
| | Viscosity (mPa · s) | 6400 | 180,000 | 1100 | 76,000 |
| | Part B | 50.00 | 44.72 | 25.00 | 22.36 |
| | Microspheres | — | 2.95 | — | 2.95 |
| | POS (V) diluent | — | — | 25.00 | 22.36 |
| | Viscosity (mPa · s) | 6300 | 170,000 | 1000 | 67,000 |
| | Relative density | 0.982 | 0.58 | 0.973 | 0.58 |
| 50/50 A + B Mixtures | Elastic modulus G' N/m² | 2000 | 21,000 | 270 | 10,500 |
| | Viscous modulus G" N/m² | 1100 | 9000 | 130 | 4150 |

What is claimed is:

1. A silicone composition crosslinkable by hydrosilylation into an adhesive and cushioning gel, comprising:

(I)—at least one polyorganosiloxane POS (I) comprising:
end siloxyl units of formula M=(R)$_2$(Hrf)SiO$_{1/2}$, at a level of 0.1 to 1 molar %,
wherein:
R=CH$_3$ and Hrf=vinyl, and
identical or different siloxyl units of formula D=(R$^1$)$_p$ (Hrf)$_q$SiO$_{2/2}$, at a level of 99 to 99.9 molar %, wherein R$^1$=CH$_3$, p=2 and q=0, (II)—at least one polyorganosiloxane POS (II) comprising:
identical or different siloxyl units of formula R$_2$SiO$_{2/2}$, wherein R is a linear C$_1$–C$_6$ alkyl group, or an aryl group, optionally substituted,
end siloxyl units M=(Hrf)$_s$(R$^2$)$_t$SiO$_{1/2}$, at a level of 1 to 6 molar %, wherein units Hrf=H, R$^2$=CH$_3$, s=1 and t=2
identical or different siloxyl units D=(Hrf)$_u$(R$^3$)$_v$SiO$_{2/2}$, at a level of 10 to 50 molar %, wherein units R$^3$=CH$_3$, Hrf=H, u=1 and v=1
with the further proviso that at least one of the D units of the POS (II) carries an Hrf (u=1, v=1), (III)—at least one adhesion promoter (III), selected from the group consisting of:
extending polyorganosiloxanes POS (III) exhibiting:
end siloxyl units M=(Hrf)$_w$(R$^4$)$_x$SiO$_{1/2}$, at a level of 8 to 20 molar %, wherein units Hrf=H, R$^4$=CH$_3$, w=1 and x=2, with the further proviso
that the Hrfs of the POS (III) react at least with the Hrfs of the end M units of the POS (I),
that the ratio:

$$r_1 = \frac{\text{number of } Hrf \text{ groups in the } POS(III)}{\text{number of } Hrf \text{ groups in the } POS(II) \text{ and in the } POS(III)} \times 100$$

is less than or equal to 95%, and that the ratio:

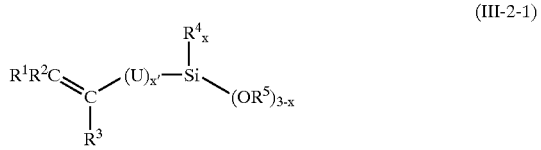

is less than or equal to 0.9; and
siloxyl units D=$(R^5)_2SiO_{2/2}$, at a level of 80 to 92 molar %, wherein units $R^5$=$CH_3$,
organosilanes comprising, per molecule, at least one $C_2$–$C_6$ alkenyl group, of the following formula (III-2-1)

$$R^1R^2C\underset{R^3}{=}C-(U)_{x'}-\underset{R^4_x}{Si}-(OR^5)_{3-x}$$ (III-2-1)

wherein
- $R^1$, $R^2$ and $R^3$ are hydrogen or hydrocarbonaceous radicals which are identical to or different from one another,
- U is a linear or branched $C_1$–$C_4$ alkylene or a divalent group of formula —CO—O-alkylene- wherein the alkylene group has the definition given above and is connected to the Si atom,
- $R^4$ and $R^5$, which are identical or different, are a linear or branched $C_1$–$C_4$ alkyl group,
- x'=0 or 1,
- x=0 to 2, preferably 0 or 1 and more preferably still 0 and organosilicon compounds comprising at least one epoxy group.

(IV)—organic hollow microspheres, (V)—at least one linear polyorganosiloxane POS (V) comprising end siloxyl units M=$(R^6)_3SiO_{1/2}$ and siloxyl units D=$(R^7)_2SiO_{2/2}$ wherein $R^6$ and $R^7$ identical different from one another have the same definition as R, and having a lower dynamic viscosity than that of the POS (I), and (VI)—an effective amount of hydrosilylation catalyst.

2. A composition according to claim 1, wherein $r_1$ is between 1 and 20% and $r_1$ is between 0.3 and 0.7.

3. A composition according to claim 1, wherein the POS (I) is linear and has a dynamic viscosity of less than or equal to 500,000 mPa·s, and the POS (II) is linear and has a dynamic viscosity of less than or equal to 100,000 mPa·s.

4. A composition according to claim 1, wherein the adhesion promoter (III) is a linear POS (III) having a dynamic viscosity of less than or equal to 100,000 mPa·s.

5. A composition according to claim 1, wherein the POS (V) has M and D units respectively comprising $R^6$=$R^7$=$CH_3$ which are present at a level of at most 20 mol % of M units and at least 80 mol % of D units, the POS (V) being present in an amount of between 10 and 90% by weight with respect to the POS (I)+(V) mixture.

6. A composition according to claim 1, wherein the microspheres have a wall composed of polymers or copolymers prepared from vinyl chloride, vinylidene chloride, acrylonitrile, methyl methacrylate or styrene monomers.

7. A composition according to claim 1, wherein the microspheres have a diameter, after expansion, of between 10 and 150 μm.

8. A composition according to claim 1, wherein the microspheres are present in a proportion of 1 to 30% by weight with respect to the total composition.

9. A crosslinkable system with at least two components A and B comprising the compounds (I) and (III) and optionally (V) and the catalyst (VI) of the composition as defined in claim 1, each of these two components A and B being devoid of a mixture of (I)+(II) or (III) with catalyst.

10. A crosslinked adhesive gel obtained from a composition as defined in claim 1.

11. A process for the preparation of prostheses, external breast prostheses, stuffing for mattresses, cushions, seats, shoe soles, or inserts, comprising the step of using a composition as defined in claim 1.

* * * * *